(12) United States Patent
Audelo Navarro et al.

(10) Patent No.: US 12,202,605 B2
(45) Date of Patent: Jan. 21, 2025

(54) RETRACTABLE DIVIDER FOR PASSENGER SEAT

(71) Applicants: Safran Seats USA LLC, Gainesville, TX (US); Safran Seats, Plaisir (FR)

(72) Inventors: Juan Carlos Adib Audelo Navarro, Chihuahua (MX); Raul Daniel Flores Aguirre, Versailles (FR)

(73) Assignees: Safran Seats USA LLC, Gainesville, TX (US); Safran Seats, Plaisir (FR)

( * ) Notice: Subject to any disclaimer, the term of this patent is extended or adjusted under 35 U.S.C. 154(b) by 14 days.

(21) Appl. No.: 18/010,252

(22) PCT Filed: Oct. 21, 2020

(86) PCT No.: PCT/US2020/056648
§ 371 (c)(1),
(2) Date: Dec. 14, 2022

(87) PCT Pub. No.: WO2021/262215
PCT Pub. Date: Dec. 30, 2021

(65) Prior Publication Data
US 2023/0264817 A1    Aug. 24, 2023

Related U.S. Application Data

(60) Provisional application No. 63/042,517, filed on Jun. 22, 2020.

(51) Int. Cl.
*B64D 11/06*    (2006.01)
(52) U.S. Cl.
CPC ...... *B64D 11/0606* (2014.12); *B64D 11/0644* (2014.12)

(58) Field of Classification Search
CPC .... B64D 11/0606; B64D 11/0644; B60N 2/91
See application file for complete search history.

(56) References Cited

U.S. PATENT DOCUMENTS

| 2005/0194827 | A1* | 9/2005 | Dowty | B60N 3/06 297/411.3 |
|---|---|---|---|---|
| 2012/0068490 | A1* | 3/2012 | Vance | B60N 2/91 296/24.46 |

(Continued)

FOREIGN PATENT DOCUMENTS

| DE | 19541567 C1 | 1/1997 |
|---|---|---|
| DE | 102004061471 A1 | 7/2006 |

(Continued)

OTHER PUBLICATIONS

International Patent Application No. PCT/US2020/056648, International Search Report and Written Opinion, dated Mar. 2, 2021.

*Primary Examiner* — Michael C Zarroli
*Assistant Examiner* — Peter A Taraschi
(74) *Attorney, Agent, or Firm* — Kilpatrick Townsend & Stockton LLP (57) ABSTRACT

A passenger seat assembly includes a passenger seat and a retractable divider assembly. The passenger seat includes a first side, a second side opposite from the first side, and a forward-facing surface extending between the first side and the second side. The retractable divider assembly is attached to the passenger seat proximate to the first side of the passenger seat and includes a divider. The divider is movable between a stowed position and a deployed position. In the deployed position, the divider extends in a forward direction relative to the forward-facing surface of the passenger seat.

9 Claims, 10 Drawing Sheets

(56) References Cited

U.S. PATENT DOCUMENTS

2016/0355109 A1* 12/2016 Geraty ................... B60N 2/90
2020/0385124 A1* 12/2020 Zhang ................... F16H 21/44
2023/0406509 A1* 12/2023 Salcedo ............ B64D 11/0646

FOREIGN PATENT DOCUMENTS

| DE | 102017107139 A1 | 10/2018 |
| FR | 2923773 A1 | 5/2009 |
| WO | 2020104798 A1 | 5/2020 |

* cited by examiner

RETRACTABLE DIVIDER FOR PASSENGER SEAT

CROSS REFERENCE TO RELATED APPLICATIONS

This application is related to and claims priority benefits from U.S. Provisional Application Ser. No. 63/042,517, filed on Jun. 22, 2020, and entitled RETRACTABLE PRIVACY SCREEN, the content of which is hereby incorporated in its entirety by this reference.

FIELD OF THE INVENTION

The field of the invention relates to seats for passenger vehicles, and more particularly to privacy accommodations for passengers in the seats.

BACKGROUND

Passenger vehicles, such as aircraft, buses, trains, ships, and automobiles, include a cabin with arrangements of passenger seats in which passengers can be seated and otherwise use during travel. Some passenger seats, such as those in an economy class of an aircraft, provide limited personal space to the passenger, and involuntary contact between passengers is very common. For example, a passenger seat assembly in economy class may accommodate two or more passengers in close proximity to each other and that must share a common armrest.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a passenger seat and a retractable divider assembly. The passenger seat includes a first side, a second side opposite from the first side, and a forward-facing surface extending between the first side and the second side. The retractable divider assembly is attached to the passenger seat proximate to the first side of the passenger seat. The retractable divider assembly includes a divider that is movable between a stowed position and a deployed position, and, in the deployed position, the divider extends in a forward direction relative to the forward-facing surface of the passenger seat.

The passenger seat may include a seat back and a seat base, and the seat back includes the forward-facing surface. In some embodiments, the retractable divider assembly is attached to the seat back at the first side of the passenger seat.

In certain embodiments, the passenger seat also includes an armrest that is pivotably attached to the first side of the passenger seat. In various embodiments, the retractable divider assembly is attached to the armrest. The retractable divider assembly may also include a driver and a cover. The driver may support the divider such that the divider is movable between the stowed position and the deployed position, wherein the cover may be attached to the armrest such that the driver is housed within the cover. In some embodiments, the armrest includes a first side, a second side opposite from the first side, and a top surface extending between the first side and the second side, and, in the deployed position, the divider extends adjacent to the first side of the armrest. In various embodiments, in the deployed position, the divider extends through the top surface of the armrest.

In certain embodiments, the retractable divider assembly also includes a divider base and a divider support. The divider base may be attached to an end of the divider and be movable with the divider between the stowed position and the deployed position. The divider support may be attached to the first side of the passenger seat, and the divider support may be configured to engage the divider base and support the divider and the divider base in the deployed position.

According to certain embodiments of the present invention, a passenger seat assembly includes a passenger seat and a retractable divider assembly. The passenger seat includes a seat back, and the seat back includes a forward-facing surface. The retractable divider assembly is attached to the passenger seat assembly and includes a divider that is movable between a stowed position and a deployed position. In some embodiments, in the deployed position, the divider extends in a forward direction relative to the forward-facing surface of the seat back.

In various embodiments, the passenger seat includes a first side and a second side opposite from the first side, the forward-facing surface extends between the first side and the second side, and the retractable divider assembly is attached to the seat back at the first side.

In some embodiments, the retractable divider assembly includes a divider base and a divider support. The divider base may be attached to an end of the divider and be movable with the divider between the stowed position and the deployed position. The divider support may be attached to the first side of the passenger seat, and the divider support may be configured to engage the divider base and support the divider and the divider base in the deployed position. In various embodiments, the passenger seat includes an armrest, and the divider support is on the armrest.

In certain embodiments, the passenger seat includes an armrest that is pivotable relative to the seat back, and the retractable divider assembly is attached to the armrest. The retractable divider assembly may include a driver and a cover. In certain embodiments, the driver supports the divider such that the divider is movable between the stowed position and the deployed position, and the cover is attached to the armrest such that the driver is housed within the cover. In some embodiments, the armrest includes a first side, a second side opposite from the first side, and a top surface extending between the first side and the second side, and, in the deployed position, the divider extends adjacent to the first side of the armrest or through the top surface of the armrest.

According to certain embodiments of the present invention, a passenger seat assembly includes a first seat back having a first forward-facing surface, a second seat back adjacent to the first seat back and having a second forward-facing surface, and a retractable divider assembly attached to the passenger seat assembly. In various cases, the retractable divider assembly includes a divider that is movable between a stowed position and a deployed position, and, in the deployed position, the divider extends in a forward direction relative to the first forward-facing surface and relative to the second forward-facing surface.

In various embodiments, the passenger seat assembly also includes a seat base, and the first seat back and the second seat back are supported on the seat base. In some cases, the retractable divider assembly is attached to the first seat back.

The retractable divider assembly may also include a divider base and a divider support. In some embodiments, the divider base is attached to an end of the divider and is movable with the divider between the stowed position and the deployed position. In certain embodiments, the divider support is attached to the first seat back and the second seat back and extends between the first seat back and the second seat back. In various embodiments, the divider support is configured to engage the divider base as well as support the divider and the divider base in the deployed position.

In certain embodiments, the passenger seat includes an armrest movable between the first seat back and the second seat back, and the retractable divider assembly is attached to the armrest. In some cases, the retractable divider assembly includes a driver and a cover. In such embodiments, the driver supports the divider such that the divider is movable between the stowed position and the deployed position, and the cover is attached to the armrest such that the driver is housed within the cover. In some embodiments, the armrest includes a first side, a second side opposite from the first side, and a top surface extending between the first side and the second side, and, in the deployed position, the divider extends adjacent to the first side of the armrest or through the top surface of the armrest.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing.

The described embodiments of the invention provide a retractable divider assembly for passenger seats. While the retractable divider assembly is discussed for use with aircraft seats, they are by no means so limited. Rather, embodiments of the retractable divider assembly may be used in passenger seats or other seats of any type or otherwise as desired.

Figure 1:
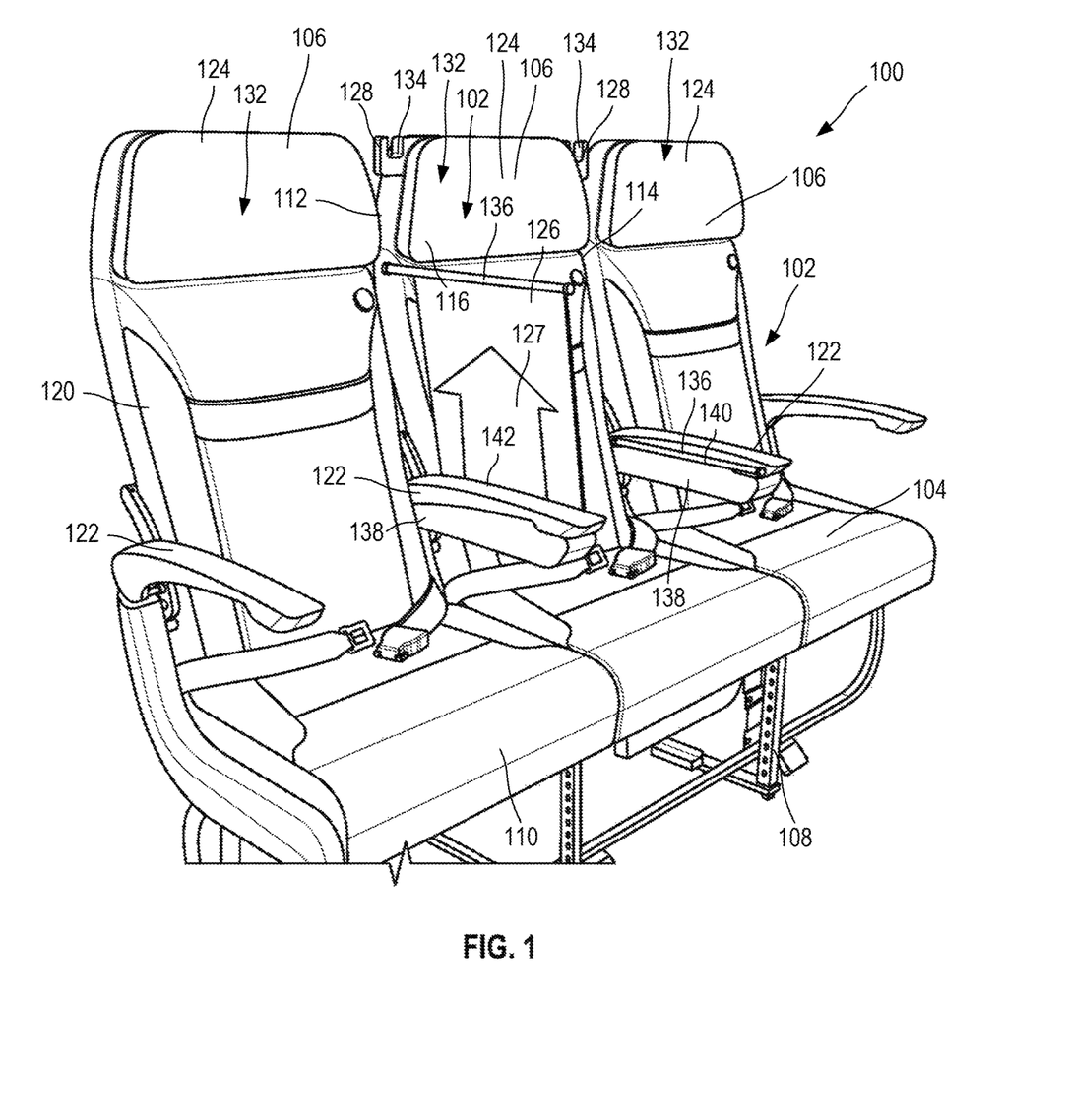
FIG. 1 is a perspective view of a passenger seat assembly with a retractable divider assembly according to certain embodiments of the present invention.
Figure 2:
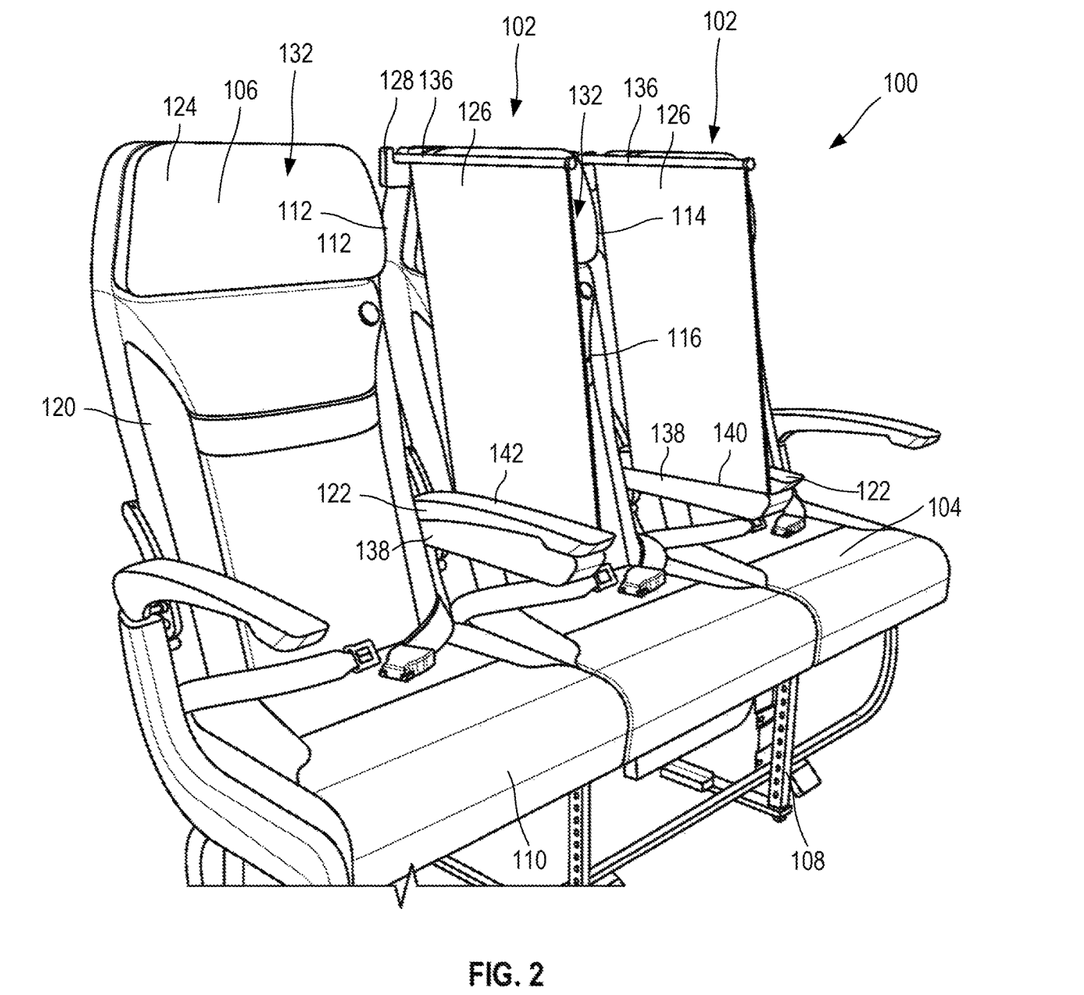
FIG. 2 is another perspective view of the passenger seat assembly of FIG. 1.
Figure 3:
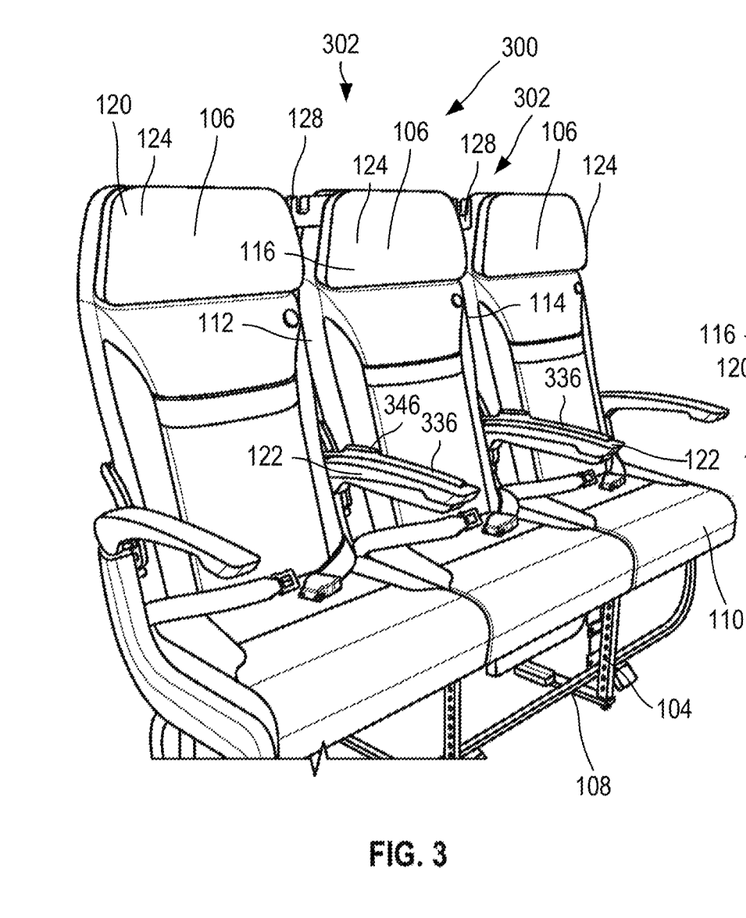
FIG. 3 is a perspective view of a passenger seat assembly with a retractable divider assembly according to certain embodiments of the present invention.

According to certain embodiments of the present invention, as shown in FIGS. 1 and 2, a passenger seat assembly 100 includes at least one retractable divider assembly 102. Any number of divider assemblies 102 may be provided with the passenger seat assembly 100 as desired. As discussed in detail below, the retractable divider assembly may be attached to various locations on the passenger seat assembly 100 and may be utilized to minimize involuntary contact between passengers using the passenger seat assembly 100 and/or otherwise define individual personal space for the passengers using the passenger seat assembly 100.

In general, the passenger seat assembly 100 includes a seat base 104 and at least one seat back 106 supported relative to the seat base 104. The number of seat backs 106 should not be considered limiting on the current disclosure. In various examples, the number of seat backs 106 corresponds with the number of passengers that the passenger seat assembly is capable of carrying, and each seat back 106 and the corresponding portion of the seat base 104 define a particular passenger seat 124. In the example of FIGS. 1 and 2, the passenger seat assembly 100 is capable of carrying three passengers and accordingly has three seat backs 106 and three passenger seats 124. However, in other examples, the passenger seat assembly 100 may be capable of carrying any desired number of passengers, such as one passenger, two passengers, four passengers, or any other desired number of passengers. In these examples, the passenger seat assembly 100 can likewise have any desired number of corresponding seat backs 106 and passenger seats 124. Each seat back 106 and the corresponding portion of the seat base 104 together at least partially define a living space 132 for the passenger when used (i.e., the space that the passenger may occupy and use while sitting in a particular passenger seat 124).

The seat base 104 of the passenger seat assembly 100 may include a leg assembly 108, cushioning 110, and/or other components as desired. Each seat back 106 is connected to the seat base 104, and is often pivotable relative to the seat base 104 such that the seat back 106 can be positioned in various positions such as a taxi-takeoff-landing (TTL) position, a reclined position, etc. Each seat back 106 includes a first side 112, a second side 114 opposite from the first side 112, a forward-facing surface 116 extending between the first side 112 and the second side 114, and an aft-facing surface (not visible in FIGS. 1 and 2) opposite from the forward-facing surface 116 and extending between the first side 112 and the second side 114. In some cases, other components of the passenger seat assembly 100, such as a tray table, in-flight entertainment equipment, cup holders, literature pockets, etc. may be supported on the seat back 106. Cushioning 120 may be provided on any of the components of the seat back 106. In various embodiments, the passenger seat assembly 100 includes one or more armrests 122 that are pivotable relative to the seat base 104 and/or the seat back(s) 106. In some cases, at least one armrest 122 may be provided between adjacent seat backs 106, although it need not be in other examples. The number or location of the armrests 122 illustrated in FIGS. 1 and 2 should not be considered limiting on the disclosure.

The retractable divider assembly 102 includes a divider 126 and a divider support 128. In various embodiments, the divider 126 may be attached at various locations on the passenger seat 124 as desired. As some non-limiting examples, the divider 126 may be attached to the first side 112 of the seat back 106, the second side 114 of the seat back 106, the armrest 122, and/or on the seat base 104 as desired. In the embodiment of FIGS. 1 and 2, dividers 126 are attached to the armrests 122 between adjacent seat backs 106.

The divider 126 may be movable (represented by arrow 127 in FIG. 1) between a stowed position as illustrated in FIG. 1 and a deployed position as illustrated in FIG. 2, and vice versa. In some embodiments, the divider 126 is movable between the stowed position and the deployed position in a vertical direction. In other embodiments, and as discussed in detail below with reference to FIGS. 12 and 13, the divider 126 may be movable between the stowed position and the deployed position in a forward and aft direction. Referring to FIG. 2, in the deployed position, the divider 126 extends in the forward direction relative to the forward-facing surface 116 of the passenger seat 124. The divider 126 in the deployed position may at least partially enclose the living space 132 of the passenger seat 124 and/or may provide a partial barrier between adjacent passenger seats 124. In the stowed position, the divider 126 may not at least partially enclose the living space of the passenger seat 124 and/or may not provide the barrier between adjacent passenger seats 124. The divider 126 may be constructed from various materials suitable for movement between the stowed position and the deployed position. In certain embodiments, the divider 126 is a non-rigid material. As some non-limiting examples, the divider 126 may be a woven material, a foil, or other suitable materials as desired.

In various examples, the divider assembly 102 includes a driver (not visible in the figures). The driver may be various suitable devices or mechanisms that support the divider 126 and enable movement of the divider 126 between the stowed position and a deployed position. Optionally, the driver may bias the divider 126 towards the stowed position or the deployed position. In one non-limiting example, the driver may be a spring drive that biases the divider 126 towards the stowed position. In such examples, a force may be required (e.g., from the passenger) to move the divider 126 from the stowed position to the deployed position, and the driver may automatically retract the divider 126 when the force is removed and/or if the divider 126 is not otherwise secured in the deployed position.

Optionally, the divider assembly 102 includes a divider cover 138. In certain aspects, the divider cover 138 may house the driver, and the divider cover 138 may at least partially house the divider 126 when the divider 126 is in the stowed position. The divider cover 138 may be constructed from various materials as desired. In the example of FIGS. 1 and 2, divider covers 138 are attached to each armrest 122 between adjacent seat backs 106, and the drivers are housed within the divider covers 138 (e.g., between the divider covers 138 and the armrests 122, respectively). However, in other embodiments and when included, the divider cover 138 may be provided at various other locations on the passenger seat 124 as desired.

In some embodiments, the divider cover 138 optionally defines a deployment slot 140 that the divider 126 may extend through such that the divider 126 may be moved between the stowed position and the deployed position. In the embodiment of FIGS. 1 and 2, the deployment slots 140 are on the sides of the armrests 122 facing the middle passenger seat 124. In other embodiments, the deployment slot 140 for a particular divider assembly 102 may be provided at other locations on the armrest 122 or passenger seat 124 as desired. In other cases, the divider cover 138 need not define the deployment slot 140. As some non-limiting examples, FIGS. 4-11 illustrate various embodiments where the deployment slot 140 is defined in a top surface 142 of the armrest 122 such that the divider 126 is movable through the armrest 122.

Optionally, the divider assembly 102 includes a divider base 136 at an end of the divider 126. The divider base 136 may be a stop for the divider 126 in the stowed position that engages the deployment slot 140. The divider base 136 may also provide a location that a passenger may grab or otherwise hold to move the divider 126 from the stowed position to the deployed position. Optionally, at least a portion of the divider base 136 may selectively engage the divider support 128 in the deployed position, and the divider base 136 and the divider support 128 may together support the divider 126 in the deployed position. The particular shape of the divider base 136 illustrated in FIGS. 1 and 2 should not be considered limiting on the disclosure, as the divider base 136 may have various other shapes or profiles as desired. In certain aspects, the divider base 136 is rigid relative to the divider 126, although it need not be in other examples. The divider base 136 may be constructed from various suitable materials as desired, including but not limited to various metals, plastics, composites, combinations thereof, or other materials as desired. In the example of FIGS. 1 and 2, the divider base 136 is an elongated plastic rod attached to the divider 126.

Figure 12:
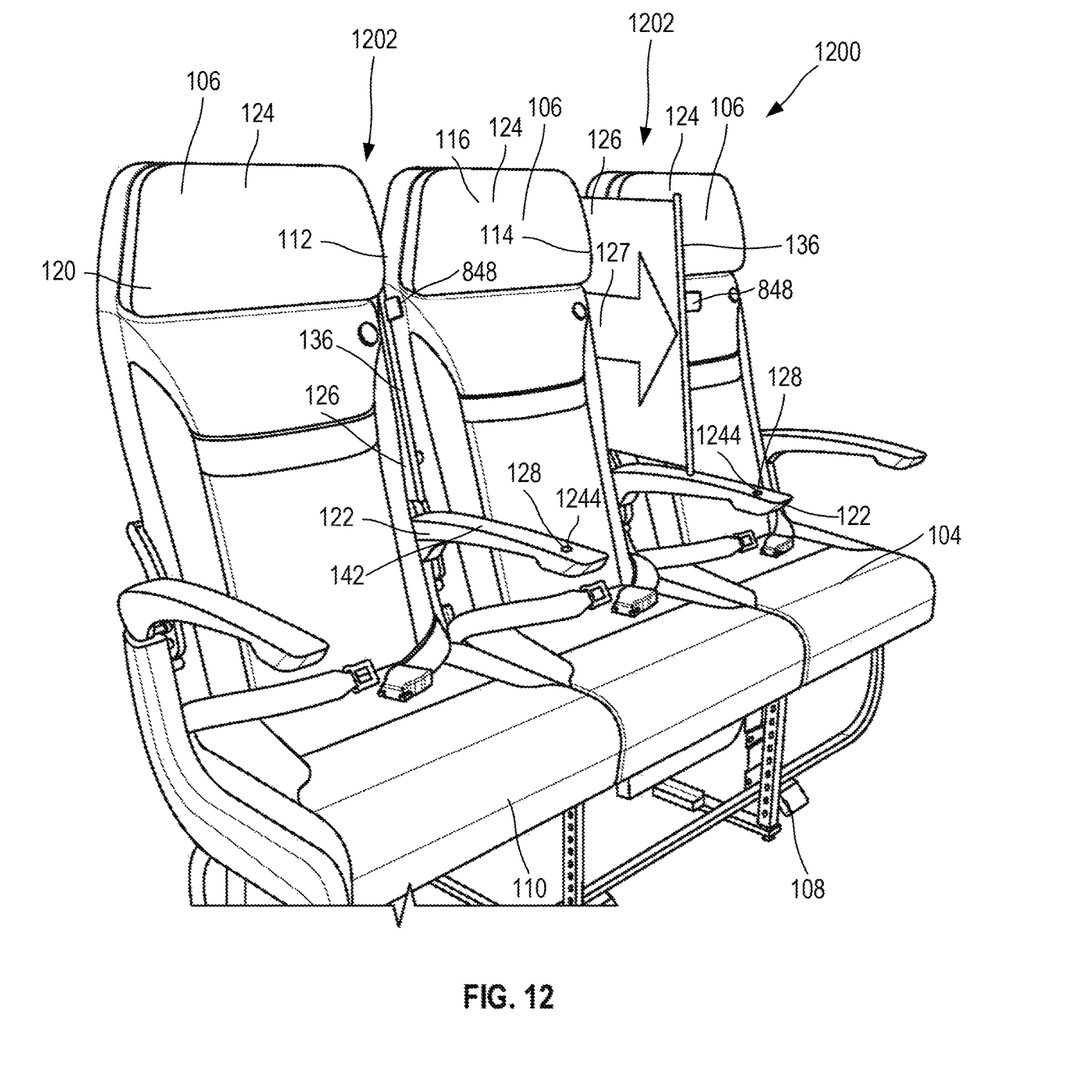
FIG. 12 is a perspective view of a passenger seat assembly with a retractable divider assembly according to certain embodiments of the present invention.
Figure 13:
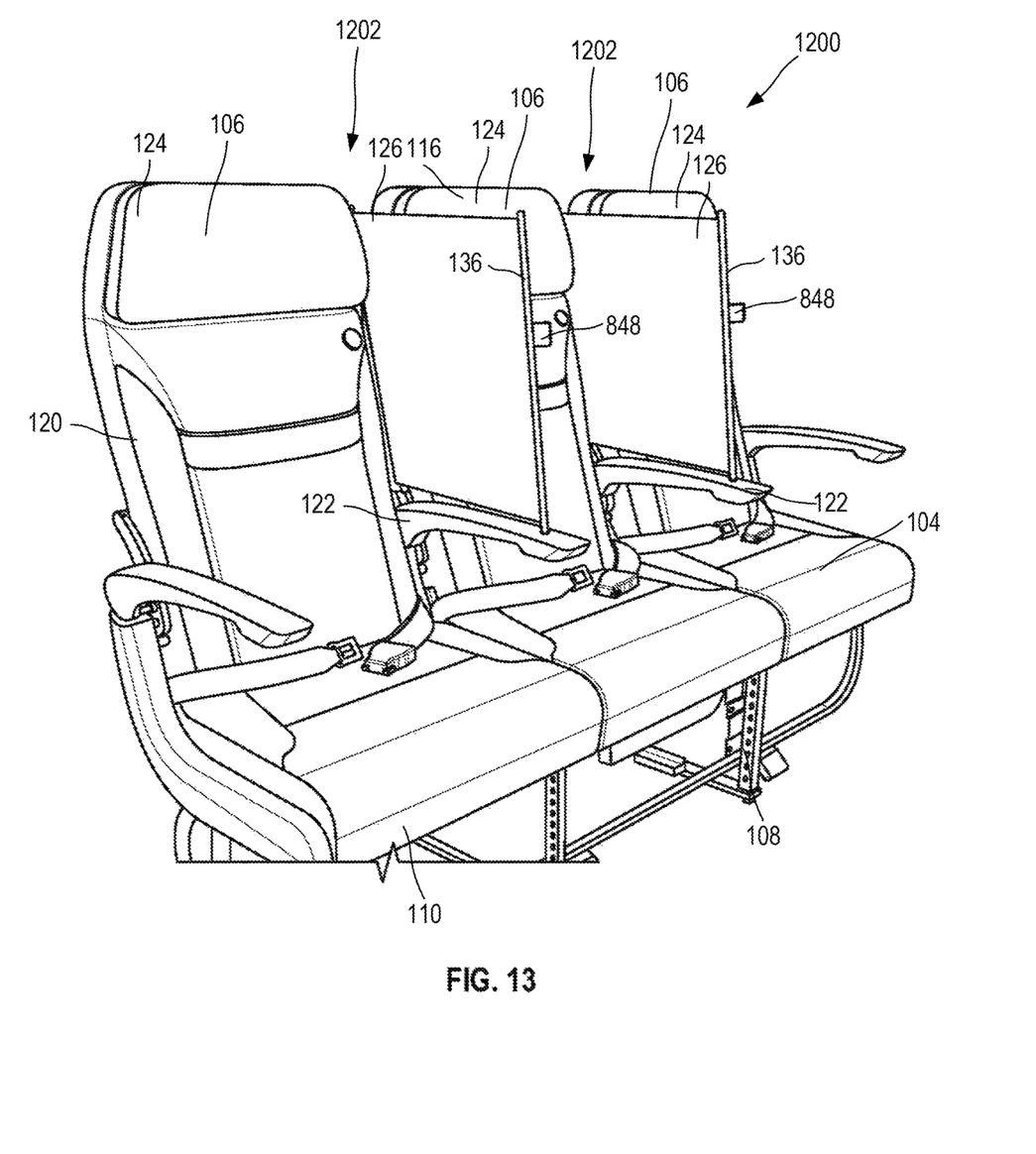
FIG. 13 is another perspective view of the passenger seat assembly of FIG. 12.

The divider support 128 may be provided on the passenger seat 124 at a location corresponding to a deployed position of the divider 126. In the example of FIGS. 1 and 2, the divider support 128 is provided on the seat back 106, although it may be provided at various other locations on the passenger seat 124 as desired. In various examples, the divider support 128 is configured to selectively engage and support the divider 126 in the deployed position. In one non-limiting example, the divider support 128 includes a support groove 134 that receives a portion of the divider 126. In the example of FIGS. 1 and 2, the support groove 134 selectively receives a portion of the divider base 136 to engage the divider 126 and support the divider 126 in the deployed position. In other examples, the divider support 128 may have various other structures or features for selectively engaging the divider 126 in the deployed position and need not include the support groove 134. As one non-limiting example, FIGS. 12 and 13 illustrate an example where the divider support 128 includes a support cavity 1244 in the top surface 142 of the armrest 122.

Referring to FIGS. 1 and 2, a method of deploying the divider 126 includes moving the divider 126 from the stowed position to the deployed position such that the divider 126 extends in a forward direction relative to the forward-facing surface 116 and such that the divider 126 at least partially encloses the living space 132 and/or provides a barrier between adjacent passenger seats 124. Optionally, moving the divider 126 includes holding the divider 126 and/or the divider base 136 and moving the divider 126 through the deployment slot 140. The method includes engaging the divider 126 with the divider support 128 such that the divider 126 is supported in the deployed position. In various embodiments, engaging the divider 126 with the divider support 128 includes engaging at least a portion of the divider base 136 with the divider support 128 such that the divider 126 is supported in the deployed position. A method of stowing the divider 126 may include disengaging the divider 126 from the divider support and moving the divider 126 from the deployed position to the stowed position such that the divider 126 does not at least partially enclose the living space 132 and/or does not provide a barrier between adjacent passenger seats 124.

Figure 4:
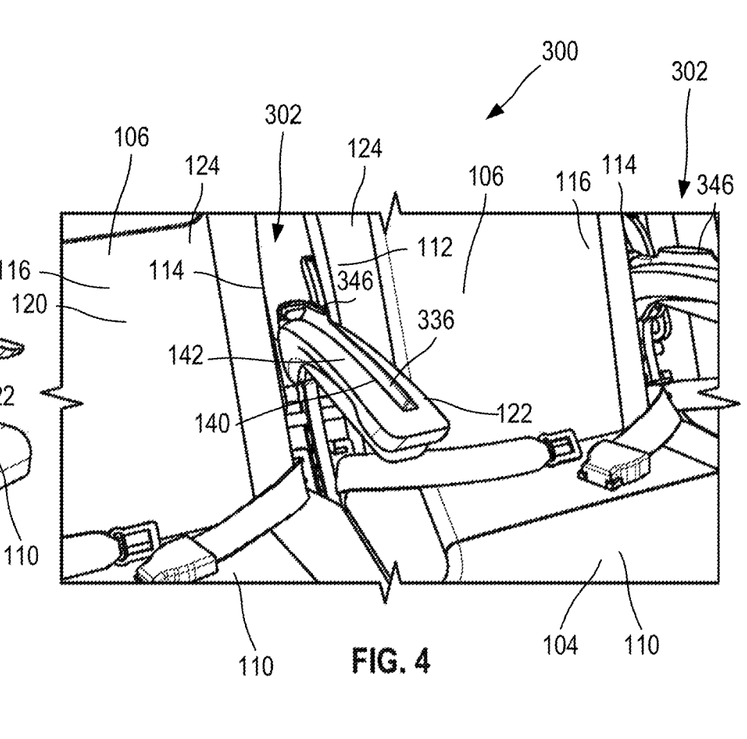
FIG. 4 is a perspective view of a portion of the passenger seat assembly of FIG. 3.
Figure 5:
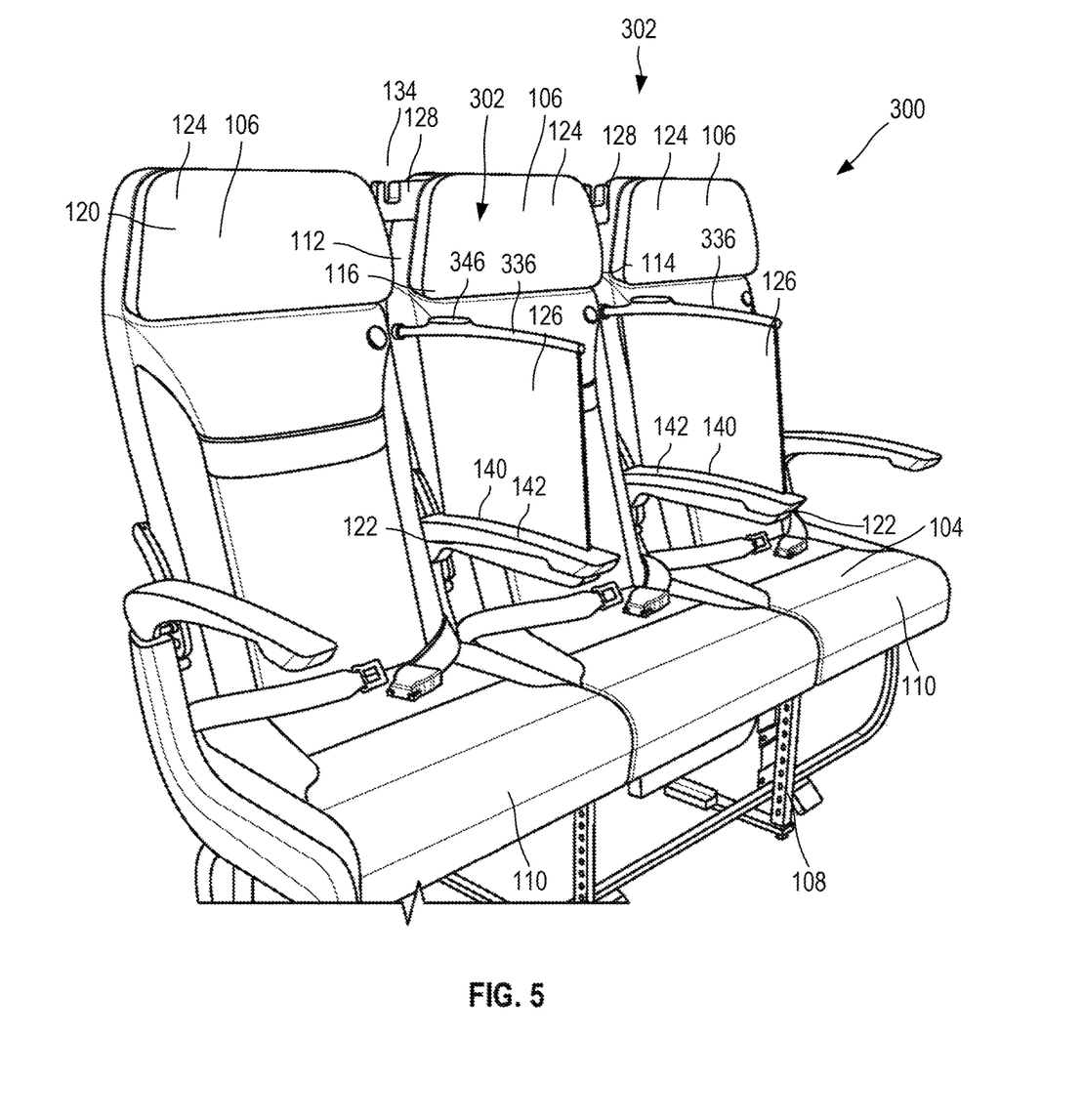
FIG. 5 is another perspective view of the passenger seat assembly of FIG. 3.
Figure 6:
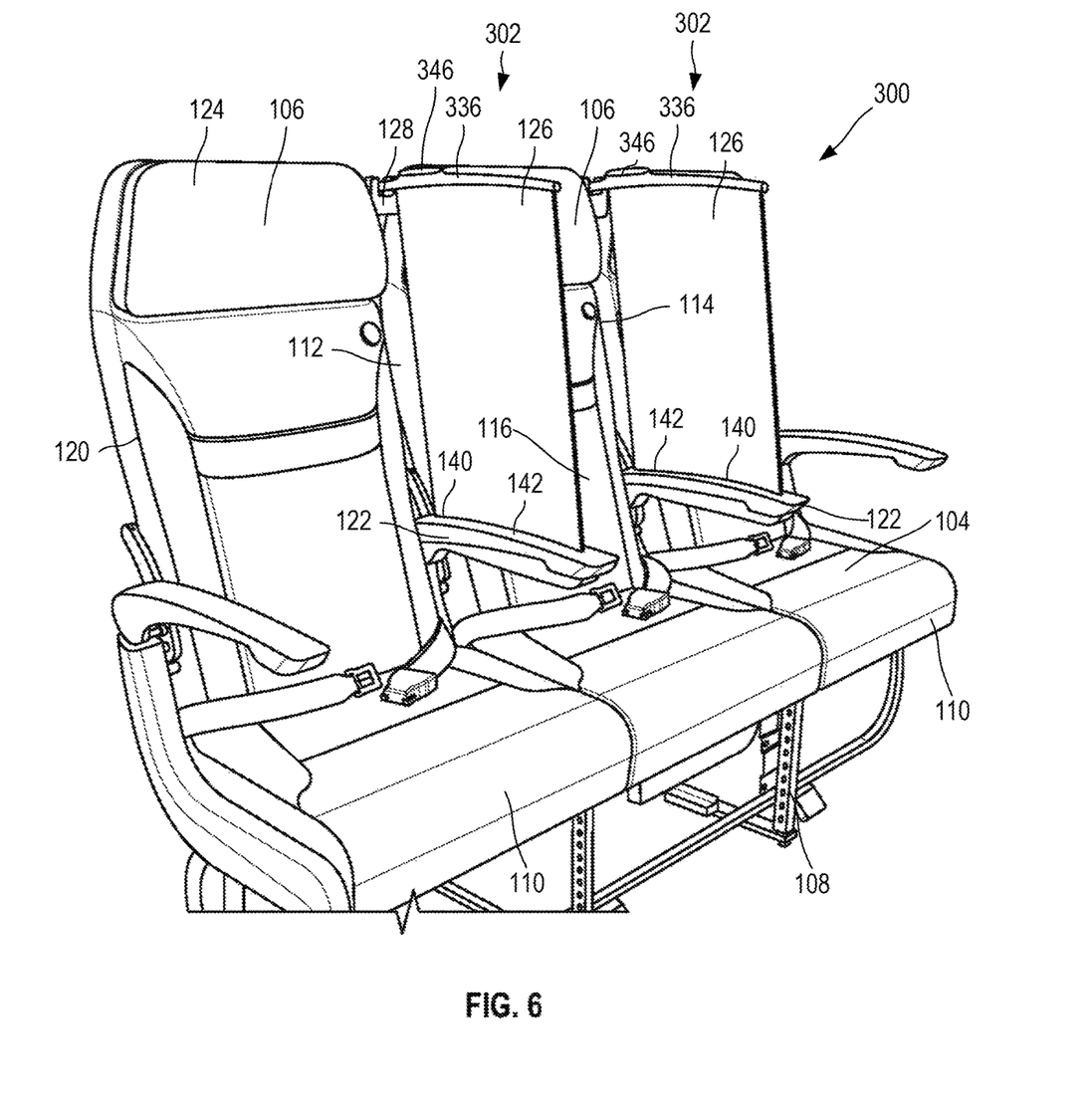
FIG. 6 is another perspective view of the passenger seat assembly of FIG. 3.

FIGS. 3-6 illustrate an embodiment of a passenger seat assembly 300 that is similar to the passenger seat assembly 100. The passenger seat assembly 300 includes a retractable divider assembly 302 that is substantially similar to the retractable divider assembly 102 except that a divider base 336 is curved and includes a gripping ridge 346 compared to the divider base 136. In various aspects, the gripping ridge 346 may facilitate gripping or otherwise holding of the divider base 336 by the passenger such as for moving the divider 126 between the stowed position and the deployed position. Compared to the divider assembly 102, divider cover 138 is omitted and the driver of the divider 126 is housed within the armrest 122. Compared to the passenger seat assembly 300, the deployment slot 140 is defined in the top surface 142 of the armrest 122. In the embodiment of FIGS. 3-6, the deployment slot 140 extends substantially parallel to a longitudinal axis of the armrest 122. The divider 126 is movable through the top surface 142 of the armrest 122 between the stowed position and the deployed position. As best illustrated in FIG. 4, in the stowed position, the divider base 336 may extend partially above the top surface 142 of the armrest 122.

Figure 7:
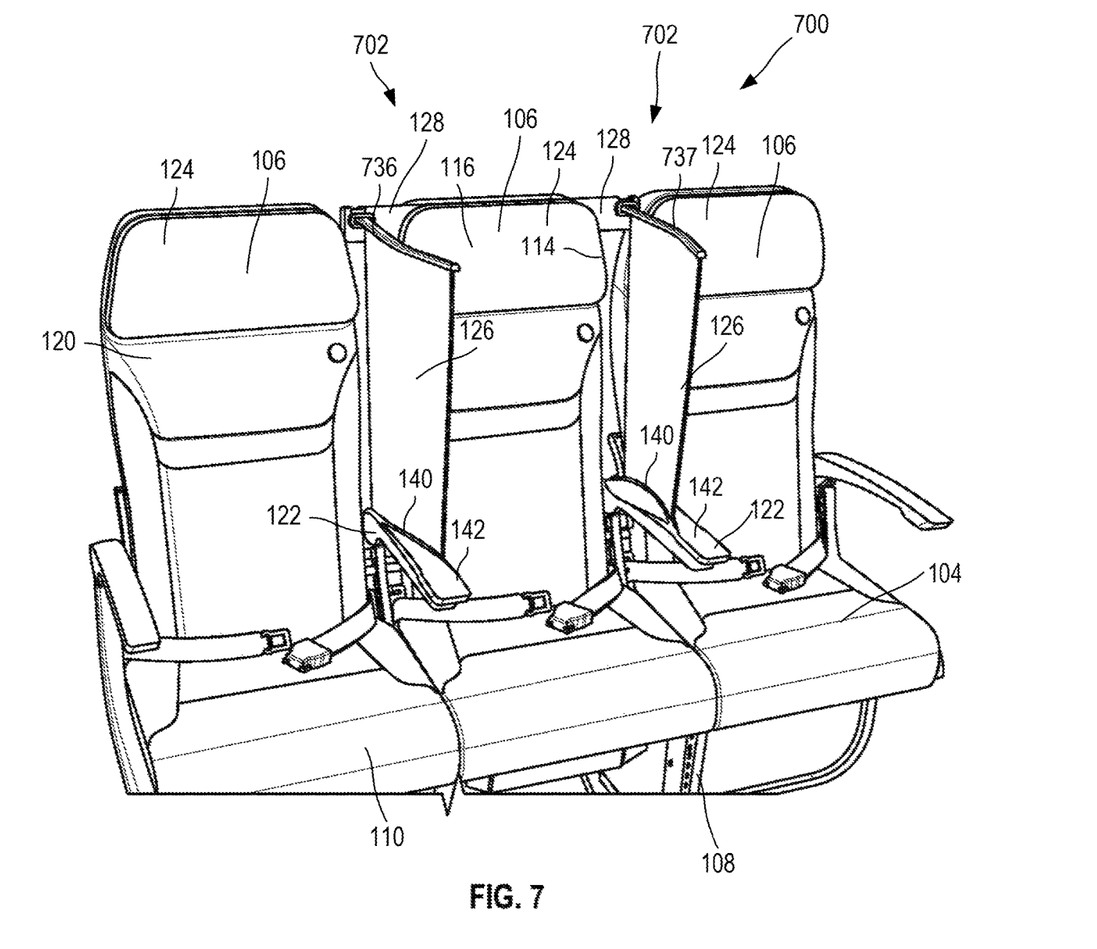
FIG. 7 is a perspective view of a passenger seat assembly with a retractable divider assembly according to certain embodiments of the present invention.

FIG. 7 illustrates an embodiment of a passenger seat assembly 700 that is substantially similar to the passenger seat assembly 300. Compared to the passenger seat assembly 300, the passenger seat assembly 700 includes a divider assembly 702 that is similar to the divider assembly 302 except that a divider base 736 is not linear in a longitudinal direction. In this embodiment, the deployment slot 140 of the passenger seat assembly 700 extends at a non-parallel angle relative to the longitudinal axis of the armrest 122.

Figure 8:
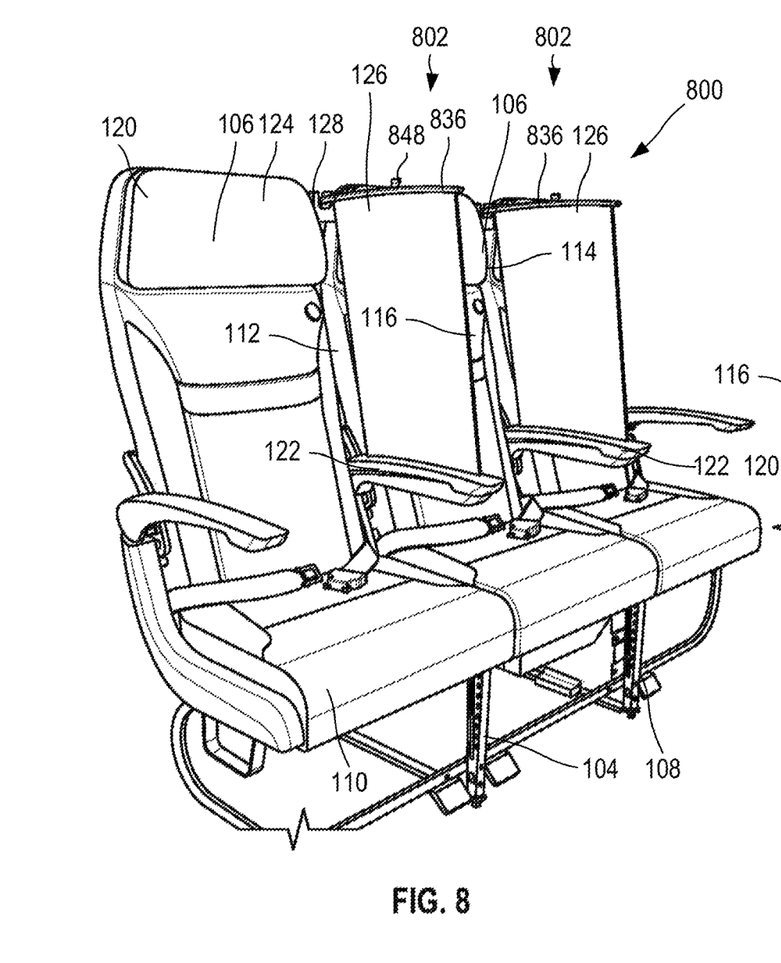
FIG. 8 is a perspective view of a passenger seat assembly with a retractable divider assembly according to certain embodiments of the present invention.
Figure 9:
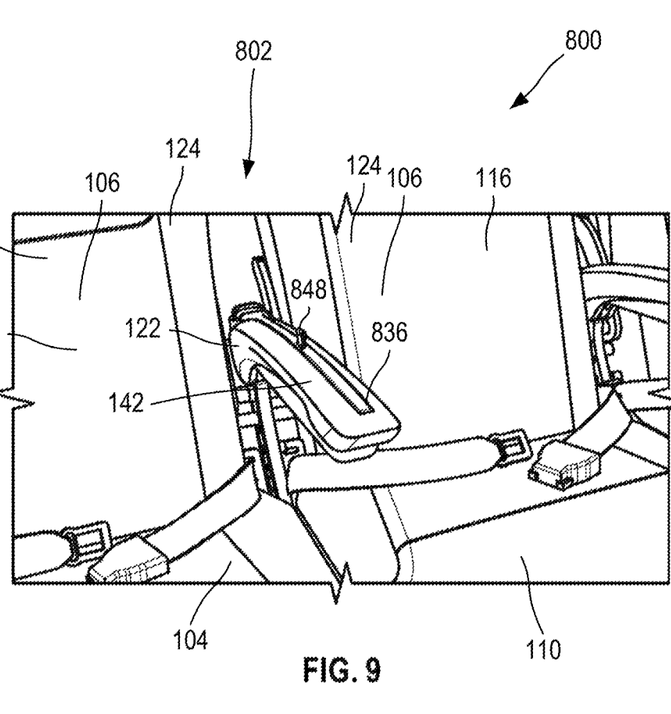
FIG. 9 is a perspective view of a portion of the passenger seat assembly of FIG. 8.

FIGS. 8 and 9 illustrate an embodiment of a passenger seat assembly 800 that is similar to the passenger seat assembly 300 and includes a retractable divider assembly 802. Compared to the passenger seat assembly 300, a divider base 836 of the divider assembly 802 is substantially similar to the divider base 336 except that the gripping ridge 346 is omitted and the divider base 836 includes a pull-tab 848. Compared to the divider base 336, and as best illustrated in FIG. 9, in the stowed position, the divider base 836 is flush with the top surface 142 of the armrest 122 and/or does not extend above the top surface 142.

Figure 10:
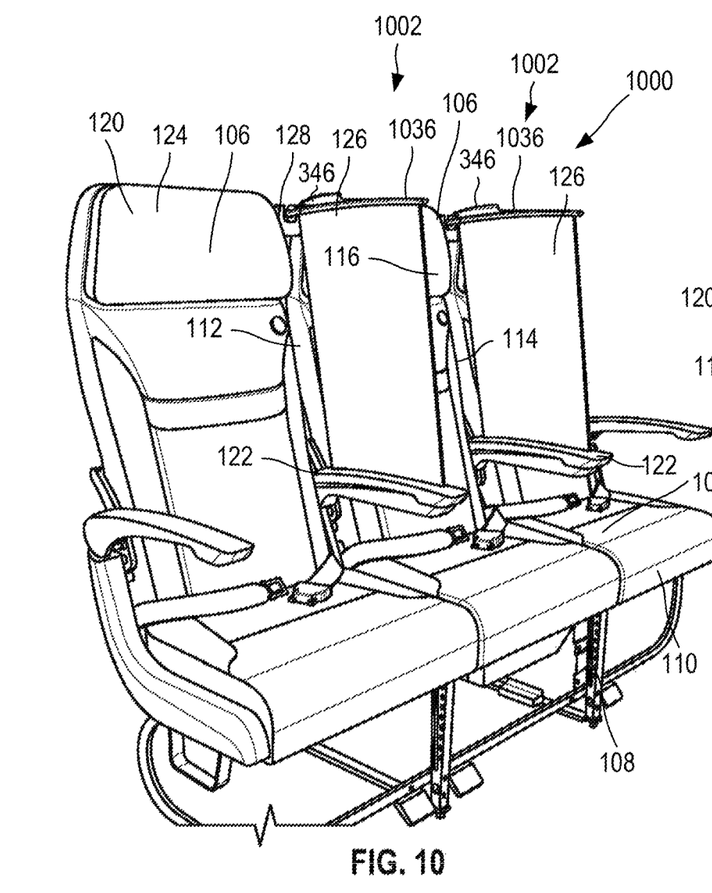
FIG. 10 is a perspective view of a passenger seat assembly with a retractable divider assembly according to certain embodiments of the present invention.
Figure 11:
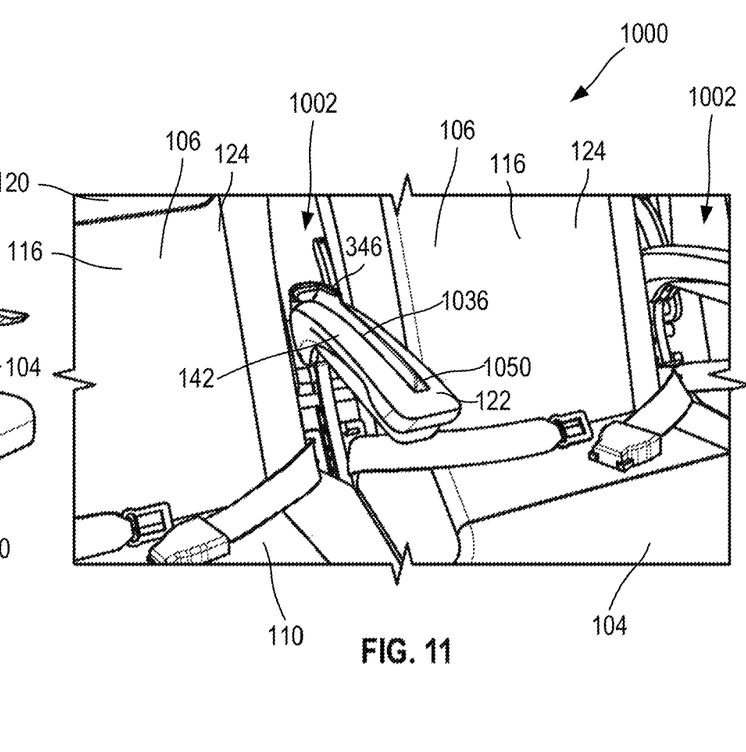
FIG. 11 is a perspective view of a portion of the passenger seat assembly of FIG. 10.

FIGS. 10 and 11 illustrate an embodiment of a passenger seat assembly 1000 that is similar to the passenger seat assembly 300 and includes a retractable divider assembly 1002. Compared to the passenger seat assembly 300, a divider base 1036 of the divider assembly 1002 includes the gripping ridge 346 and a tapered forward edge 1050. Similar to the divider base 336, and as best illustrated in FIG. 11, the divider base 1036 may extend partially above the top surface 142 of the armrest 122.

FIGS. 12 and 13 illustrate an embodiment of a passenger seat assembly 1200 that is similar to the passenger seat assembly 100 and includes a retractable divider assembly 1202. Similar to the divider assembly 102, the retractable divider assembly includes the divider 126, the divider support 128, the divider base 136, and the driver. Compared to the divider assembly 102, the dividers 126 are supported on the sides 112, 114 of the seat back 106 and are deployable in a forward and aft direction. Compared to the divider assembly 102, the divider support 128 of the divider assembly 1202 includes the support cavity 1244 in the top surface 142 of the armrest 122 that selectively receives the divider base 136. As illustrated in FIGS. 12 and 13, similar to the divider assembly 102, the divider 126 of the divider assembly 1202 in the deployed position may at least partially enclose the living space 132 of the passenger seat 124 and/or may provide a partial barrier between adjacent passenger seats 124 by extending forward relative to the forward-facing surface 116. Similarly, in the stowed position, the divider 126 of the divider assembly 1202 may not at least partially enclose the living space of the passenger seat 124 and/or may not provide the barrier between adjacent passenger seats 124. As previously discussed, in other embodiments a divider assembly with a divider may be provided at various other locations on a passenger seat 124 as desired.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A passenger seat assembly comprising: a passenger seat comprising a first side, a second side opposite from the first side, and a forward-facing surface extending between the first side and the second side; and a retractable divider assembly attached to the passenger seat proximate to the first side of the passenger seat, wherein the retractable divider assembly comprises a divider that is movable between a stowed position and a deployed position, and wherein, in the deployed position, the divider extends in a forward direction relative to the forward-facing surface of the passenger seat.

Illustration 2. The passenger seat assembly of any preceding or subsequent illustrations or combination of illustrations, wherein the passenger seat further comprises a seat back and a seat base, wherein the seat back comprises the forward-facing surface, and wherein the retractable divider assembly is attached to the seat back at the first side of the passenger seat.

Illustration 3. The passenger seat assembly of any preceding or subsequent illustrations or combination of illustrations, wherein the passenger seat further comprises an armrest pivotably attached to the first side of the passenger seat, and wherein the retractable divider assembly is attached to the armrest.

Illustration 4. The passenger seat assembly of any preceding or subsequent illustrations or combination of illustrations, wherein the retractable divider assembly further comprises a driver and a cover, wherein the driver supports the divider such that the divider is movable between the stowed position and the deployed position, wherein the cover is attached to the armrest, and wherein the driver is housed within the cover.

Illustration 5. The passenger seat assembly of any preceding or subsequent illustrations or combination of illustrations, wherein the armrest comprises a first side, a second side opposite from the first side, and a top surface extending between the first side and the second side, and wherein, in the deployed position, the divider extends adjacent to the first side of the armrest.

Illustration 6. The passenger seat assembly of any preceding or subsequent illustrations or combination of illustrations, wherein the armrest comprises a first side, a second side opposite from the first side, and a top surface extending between the first side and the second side, and wherein, in the deployed position, the divider extends through the top surface of the armrest.

Illustration 7. The passenger seat assembly of any preceding or subsequent illustrations or combination of illustrations, wherein the retractable divider assembly further comprises a divider base and a divider support, wherein the divider base is attached to an end of the divider and is movable with the divider between the stowed position and the deployed position, wherein the divider support is attached to the first side of the passenger seat, and wherein the divider support is configured to engage the divider base and support the divider and the divider base in the deployed position.

Illustration 8. A passenger seat assembly comprising: a passenger seat comprising a seat back, wherein the seat back comprises a forward-facing surface; and a retractable divider assembly attached to the passenger seat assembly, wherein the retractable divider assembly comprises a divider that is movable between a stowed position and a deployed position, and wherein, in the deployed position, the divider extends in a forward direction relative to the forward-facing surface of the seat back.

Illustration 9. The passenger seat assembly of any preceding or subsequent illustrations or combination of illustrations, wherein the passenger seat further comprises a first side and a second side opposite from the first side, wherein the forward-facing surface extends between the first side and the second side, and wherein the retractable divider assembly is attached to the seat back at the first side.

Illustration 10. The passenger seat assembly of any preceding or subsequent illustrations or combination of illustrations, wherein the retractable divider assembly further comprises a divider base and a divider support, wherein the divider base is attached to an end of the divider and is movable with the divider between the stowed position and the deployed position, wherein the divider support is attached to the first side of the passenger seat, and wherein the divider support is configured to engage the divider base and support the divider and the divider base in the deployed position.

Illustration 11. The passenger seat assembly of any preceding or subsequent illustrations or combination of illustrations, wherein the passenger seat further comprises an armrest, and wherein the divider support is on the armrest.

Illustration 12. The passenger seat assembly of any preceding or subsequent illustrations or combination of illustrations, wherein the passenger seat further comprises an armrest, wherein the armrest is pivotable relative to the seat back, and wherein the retractable divider assembly is attached to the armrest.

Illustration 13. The passenger seat assembly of any preceding or subsequent illustrations or combination of illustrations, wherein the retractable divider assembly further comprises a driver and a cover, wherein the driver supports the divider such that the divider is movable between the stowed position and the deployed position, wherein the cover is attached to the armrest, and wherein the driver is housed within the cover.

Illustration 14. The passenger seat assembly of any preceding or subsequent illustrations or combination of illustrations, wherein the armrest comprises a first side, a second side opposite from the first side, and a top surface extending between the first side and the second side, and wherein, in the deployed position, the divider extends adjacent to the first side of the armrest or through the top surface of the armrest.

Illustration 15. A passenger seat assembly comprising: a first seat back comprising a first forward-facing surface; a second seat back adjacent to the first seat back and comprising a second forward-facing surface; and a retractable divider assembly attached to the passenger seat assembly, wherein the retractable divider assembly comprises a divider that is movable between a stowed position and a deployed position, and wherein, in the deployed position, the divider extends in a forward direction relative to the first forward-facing surface and relative to the second forward-facing surface.

Illustration 16. The passenger seat assembly of any preceding or subsequent illustrations or combination of illustrations, further comprising a seat base, wherein the first seat back and the second seat back are supported on the seat base, and wherein the retractable divider assembly is attached to the first seat back.

Illustration 17. The passenger seat assembly of any preceding or subsequent illustrations or combination of illustrations, wherein the retractable divider assembly further comprises a divider base and a divider support, wherein the divider base is attached to an end of the divider and is movable with the divider between the stowed position and the deployed position, wherein the divider support is attached to the first seat back and the second seat back and extends between the first seat back and the second seat back, and wherein the divider support is configured to engage the divider base and support the divider and the divider base in the deployed position.

Illustration 18. The passenger seat assembly of any preceding or subsequent illustrations or combination of illustrations, wherein the passenger seat further comprises an armrest movable between the first seat back and the second seat back, and wherein the retractable divider assembly is attached to the armrest.

Illustration 19. The passenger seat assembly of any preceding or subsequent illustrations or combination of illustrations, wherein the retractable divider assembly further comprises a driver and a cover, wherein the driver supports the divider such that the divider is movable between the stowed position and the deployed position, wherein the cover is attached to the armrest, and wherein the driver is housed within the cover.

Illustration 20. The passenger seat assembly of any preceding or subsequent illustrations or combination of illustrations, wherein the armrest comprises a first side, a second side opposite from the first side, and a top surface extending between the first side and the second side, and wherein, in the deployed position, the divider extends adjacent to the first side of the armrest or through the top surface of the armrest.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
a passenger seat comprising a first side, a second side opposite from the first side, and a forward-facing surface extending between the first side and the second side; and
a retractable divider assembly attached to the passenger seat proximate to the first side of the passenger seat, wherein the retractable divider assembly comprises a divider that is linearly movable in either (i) a vertical direction or (ii) a forward and aft direction, wherein the divider is movable between a stowed position and a deployed position, and wherein, in the deployed position, the divider extends in a forward direction relative to the forward-facing surface of the passenger seat,
wherein the retractable divider assembly is attached to the seat back at the first side,
wherein the retractable divider assembly further comprises a divider base and a divider support, wherein the divider base is attached to an end of the divider and is movable with the divider between the stowed position and the deployed position, wherein the divider support is attached to the first side of the passenger seat, and wherein the divider support is configured to engage the divider base and support the divider and the divider base in the deployed position, wherein the divider support comprises a support groove or support cavity that receives a portion of the divider base.

2. The passenger seat assembly of claim 1, wherein the passenger seat further comprises a seat back and a seat base, wherein the seat back comprises the forward-facing surface, and wherein the retractable divider assembly is attached to the seat back at the first side of the passenger seat.

3. The passenger seat assembly of claim 1, wherein the passenger seat further comprises an armrest pivotably attached to the first side of the passenger seat, and wherein the retractable divider assembly is attached to the armrest.

4. The passenger seat assembly of claim 3, wherein the retractable divider assembly further comprises a driver and a cover, wherein the driver supports the divider such that the divider is movable between the stowed position and the deployed position, wherein the cover is attached to the armrest, and wherein the driver is housed within the cover.

5. The passenger seat assembly of claim 3, wherein the armrest comprises a first side, a second side opposite from the first side, and a top surface extending between the first side and the second side, and wherein, in the deployed position, the divider extends adjacent to the first side of the armrest.

6. The passenger seat assembly of claim 3, wherein the armrest comprises a first side, a second side opposite from the first side, and a top surface extending between the first side and the second side, and wherein, in the deployed position, the divider extends through the top surface of the armrest.

7. A passenger seat assembly comprising:
a passenger seat comprising a seat back, wherein the seat back comprises a forward-facing surface; and
a retractable divider assembly attached to the passenger seat assembly, wherein the retractable divider assembly comprises a divider that is linearly movable in either (i) a vertical direction or (ii) a forward and aft direction, the divider movable between a stowed position and a deployed position, and wherein, in the deployed position, the divider extends in a forward direction relative to the forward-facing surface of the seat back,
wherein the passenger seat further comprises a first side and a second side opposite from the first side, and the forward-facing surface extends between the first side and the second side,
wherein the retractable divider assembly is attached to the seat back at the first side,
wherein the retractable divider assembly further comprises a divider base and a divider support,
wherein the divider base is attached to an end of the divider and is movable with the divider between the stowed position and the deployed position,
wherein the divider support is configured to engage the divider base and support the divider and the divider base in the deployed position, and
wherein the passenger seat further comprises an armrest, and wherein the divider support is on the armrest.

8. The passenger seat assembly of claim 7, wherein the retractable divider assembly further comprises a driver and a cover, wherein the driver supports the divider such that the divider is movable between the stowed position and the deployed position, wherein the cover is attached to the armrest, and wherein the driver is housed within the cover.

9. The passenger seat assembly of claim 7, wherein the armrest comprises a first side, a second side opposite from the first side, and a top surface extending between the first side and the second side, and wherein, in the deployed position, the divider extends adjacent to the first side of the armrest or through the top surface of the armrest.

* * * * *